United States Patent
Beck et al.

(10) Patent No.: US 9,611,918 B2
(45) Date of Patent: Apr. 4, 2017

(54) MULTISTEP-AUTOMATIC-TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Josef Haupt, Tettnang (DE); Martin Brehmer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/706,233

(22) Filed: May 7, 2015

(65) Prior Publication Data

US 2015/0323045 A1    Nov. 12, 2015

(30) Foreign Application Priority Data

May 7, 2014    (DE) ......................... 10 2014 208 576

(51) Int. Cl.
*F16H 3/66*    (2006.01)
(52) U.S. Cl.
CPC ............... *F16H 3/66* (2013.01); *F16H 3/666* (2013.01); *F16H 2200/0073* (2013.01);
(Continued)

(58) Field of Classification Search
None
See application file for complete search history.

(56) References Cited

U.S. PATENT DOCUMENTS 8,545,362 B1    10/2013 Goleski et al.
8,858,387 B2    10/2014 Haupt et al.
(Continued)

FOREIGN PATENT DOCUMENTS

DE    102005002337    8/2006
DE    202007017648    5/2008
(Continued)

OTHER PUBLICATIONS

ZF Friedrichshafen AG, German Patent Application No. 10 2014 208 576.4; Search Report, dated Sep. 25, 2014; (7 pages).

*Primary Examiner* — Robert A Siconolfi
*Assistant Examiner* — Ryan Dodd
(74) *Attorney, Agent, or Firm* — Dority & Manning, P.A.

(57) ABSTRACT

An automatic transmission includes nine rotatable shafts and four planetary gear sets, each with a first, second and third element. For the shifting of multiple forward gears and one reverse gear, seven shift elements are provided. The second element of the fourth planetary gear set forms the first shaft designed as a drive shaft, the second element of the third planetary gear set forms the second shaft designed as an output shaft, the first element of the fourth planetary gear set forms the third shaft, one element of the planetary gear set forms the fourth shaft, the third element of the third planetary gear set forms the sixth shaft, the second element of the second planetary gear set forms the eighth shaft. The third element of the second planetary gear set and the first element of the third planetary gear set are connected to each other as the fifth shaft. The first element of the second planetary gear set and the third element of the fourth planetary gear set are connected to each other as the seventh shaft. The third shaft can be fixed through the first shift element. The fourth shaft is constantly and directly connected to the second shift element. The first shaft is connectable to the fifth shaft through the third shift element. The ninth shaft is not directly connected to any of the planetary gear sets, is connectable to the sixth shaft through the fourth shift element, is connectable to the seventh shaft through the fifth shift element, is connectable to the eighth shaft through the sixth shift element and is connectable to the first shaft through the seventh shift element.

37 Claims, 11 Drawing Sheets

(52) U.S. Cl.
CPC ............ *F16H 2200/2012* (2013.01); *F16H 2200/2048* (2013.01); *F16H 2200/2097* (2013.01)

(56) References Cited

U.S. PATENT DOCUMENTS

| | | | |
|---|---|---|---|
| 2010/0048344 A1 | 2/2010 | Kamm et al. | |
| 2010/0279814 A1* | 11/2010 | Brehmer | F16H 3/66 475/275 |
| 2011/0294617 A1* | 12/2011 | Seo | F16H 3/666 475/275 |

FOREIGN PATENT DOCUMENTS

| | | |
|---|---|---|
| DE | 102009001253 | 6/2010 |
| DE | 102010041575 | 1/2012 |

* cited by examiner

| Gear | Engaged Shift Elements | | | | | | |
|---|---|---|---|---|---|---|---|
| | Brakes | | Clutches | | | | |
| | A | B | C | D | E | F | G |
| 1 | X | X | | | | X | X |
| 2 | X | X | X | | | X | |
| 3 | X | X | | | X | X | |
| 4 | | X | X | | X | X | |
| 5 | | X | | X | X | X | |
| 6 | | X | X | X | X | | |
| 7 | | X | X | X | | X | |
| 8 | | | X | X | X | X | |
| 9 | X | | X | X | | X | |
| 10 | X | | X | X | X | | |
| 11 | X | | | X | X | X | |
| R | X | X | | X | | X | |

Fig. 4

| Planetary Gear Set Type Combinations | | | |
|---|---|---|---|
| RS1 | RS4 | RS2 | RS3 |
| Minus | Minus | Minus | Minus |
| Plus | Minus | Minus | Minus |
| Minus | Minus | Plus | Minus |
| Plus | Minus | Plus | Minus |

Fig. 5

MULTISTEP-AUTOMATIC-TRANSMISSION

FIELD OF INVENTION

The present invention relates to a multi-speed automatic transmission of planetary design.

BACKGROUND

Generally, automatically shiftable vehicle transmissions of planetary design are already described in the art and are subject to continuous development and improvement. Such transmissions should feature a sufficient number of forward gears and one reverse gear and a transmission ratio that is very well-suited for motor vehicles with a high overall spread, favorable progressive ratio and a sufficiently large start-up transmission ratio for the specific application. In addition, this transmission should require low construction costs, in particular a low number of shift elements and, upon a sequential shifting operation, should avoid so-called "group gearshifts," such that, when there are gearshifts to the next higher or next lower gear, only one previously engaged shift element is open, and one previously open shift element is engaged.

Such a multi-speed automatic transmission emerges, for example, from DE 10 2005 002 337 A1 of the applicant. It essentially comprises, inclusively, one drive shaft and one output shaft, a total of eight rotatable shafts, a total of four individual planetary gear sets and five shift elements. Through the selective engaging of three of five shift elements designed as clutches and brakes, a total of eight forward gears can be shifted without any group gearshifts.

A transmission diagram alternative to the 8-gear automatic transmission known from DE 10 2005 002 337 A1 is known from DE 10 2010 041 575 B3 of the applicant. Herein, a transmission with four individual planetary gear sets, five shift elements and a total of nine shafts is proposed, with which, compared to DE 10 2005 002 337 A1, the ring gear of the first planetary gear set arranged close to the drive is firmly connected to the transmission housing, and the sun gear of such first planetary gear set is connectable to the third shaft through the second shift element, which on its part can be fixed at the transmission housing through the first shift element.

A further development of the 8-gear automatic transmission known from DE 10 2005 002 337 A1 is known from DE 10 2009 001 253 B3 of the applicant. Here, through the addition of a sixth shift element formed as a clutch in the power flow between the drive shaft and the second planetary gear set that can be blocked through the engaging of the fifth of the previously present five shift elements, an additional forward gear can be represented, which, from its transmission ratio, is larger than the previous first gear of the 8-gear transmission, thus an additional start-up gear below the previous first gear of the 8-gear transmission.

A transmission diagram of a 10-gear automatic transmission is known from U.S. Pat. No. 8,545,362 B1, which conforms to this type and represents a further development of the 8-gear automatic transmission shown in FIG. 9 of DE 10 2005 002 337 A1. The modifications undertaken in U.S. Pat. No. 8,545,362 B1, compared to DE 10 2005 002 337 A1, concern the type and manner of the blocking of the second planetary gear set, which is neither constantly connected to the drive shaft or output shaft or directly connectable to the transmission housing. For this purpose, an additional sixth shift element is provided in U.S. Pat. No. 8,545,362 B1. As with DE 10 2005 002 337 A1, with U.S. Pat. No. 8,545,362 B1, the first planetary gear set is connectable to the transmission housing, the third planetary gear set is constantly connected to the output shaft and the fourth planetary gear set is constantly connected to the drive shaft. Thereby, the planetary gear carrier of the second planetary gear set forms the eighth shaft of the transmission, while the clutch shaft, which constantly connects the planetary gear carrier of the first planetary gear set to the ring gear of the third planetary gear set, forms the sixth shaft of the transmission. While, in FIG. 9 of DE 10 2005 002 337 A1, the eighth shaft is still constantly connected to both the fifth shift element provided for the blocking of the second planetary gear set and the fourth shift element leading to the sixth shaft, with U.S. Pat. No. 8,545,362 B1, the eighth shaft is separated from such two shift elements by the sixth shift element, which is an addition compared to DE 10 2005 002 337 A1. The additional sixth shift element is arranged in the power flow between the planetary gear carrier of the second planetary gear set and both the fourth and the fifth shift elements. As a result, the second planetary gear set can now be blocked through the simultaneous engaging of the fifth and sixth shift elements.

SUMMARY OF THE INVENTION

The present invention is directed to a multi-speed transmission with a total of four planetary gear sets, which, by means of a relatively low modified transmission diagram, features at least eleven forward gears that can be shifted without any group gearshifts. Additional objectives and advantages of the invention set will be set forth in part in the following description, or may be obvious from the description, or may be learned through practice of the invention.

Accordingly, an automatic transmission is proposed, which features a housing, a total of at least nine rotatable shafts including one drive shaft and including one output shaft, four individual planetary gear sets and seven shift elements, the selective meshing of of which leads to the shifting of several forward gears and at least one reverse gear. Each of the four planetary gear sets features three different elements, including one sun gear, one planetary gear carrier and one ring gear.

The second element of the fourth planetary gear set forms the shaft designed as a drive shaft. The second element of the third planetary gear set forms the second shaft designed as a drive shaft. The first element of the fourth planetary gear set forms the third shaft. One of the three elements of the first planetary gear set forms the fourth shaft. The third element of the second planetary gear set and the first element of the third planetary gear set are constantly connected to each other in a torque-proof or torsionally flexible manner and form the fifth shaft. The third element of the third planetary gear set forms the sixth shaft. The first element of the second planetary gear set and the third element of the fourth planetary gear set are constantly connected to each other in a torque-proof or torsionally flexible manner and form (in the manner of a clutch shaft) the seventh shaft. The second element of the second planetary gear set forms the eighth shaft. The ninth shaft is not directly connected to any of the planetary gear sets.

The third shaft can be fixed to the transmission housing through the first shift element. The fourth shaft is constantly and directly connected to the second shift element. The first shaft (drive shaft) is connectable to the fifth shaft through the third shift element and is connectable to the ninth shaft through the seventh shift element. The ninth shaft is connectable to the sixth shaft through the fourth shift element, is connectable to the seventh shaft through the fifth shift element and is connectable to the eighth shaft through the sixth shift element.

Thus, the first shift element is arranged in the power flow between the third shaft and the housing, such that the first shift element is constantly and directly connected to both the first element of the fourth planetary gear set and the transmission housing; the third shift element is arranged in the power flow between the first shaft and the fifth shaft, such that the third shift element is constantly and directly connected to both the first shaft and the third element of the second planetary gear set; the fourth shift element is arranged in the power flow between the sixth shaft and the ninth shaft, such that the fourth shift element is constantly and directly connected to both the third element of the third planetary gear and the ninth shaft, whereas the ninth shaft on its part does not feature a direct connection to any of the four planetary gear sets; the fifth shift element is arranged in the power flow between the seventh and the ninth shaft, such that the fifth shift element is constantly and directly connected to both the first element of the second planetary gear set and the third element of the fourth planetary gear set and the ninth shaft, whereas the ninth shaft on its part does not feature a direct connection to any of the four planetary gear sets; the sixth shift element is arranged in the power flow between the eighth shaft and the ninth shaft, such that the sixth shift element is constantly and directly connected to both the second element of the second planetary gear set and the ninth shaft, whereas the ninth shaft on its part does not feature a direct connection to any of the four planetary gear sets; the seventh shift element is arranged in the power flow between the first shaft (drive shaft) and the ninth shaft, such the seventh shift element is constantly and directly connected to both the first shaft (drive shaft) and the ninth shaft, whereas the ninth shaft on its part does not feature a direct connection to any of the four planetary gear sets.

Thereby, with the formulation of "directly connected" in connection with the coupling of a shift element to a planetary gear set, it must be understood that the input or output element of the respective shift element is connected to one of the elements of the respective planetary gear set through a torque-proof or torsionally flexible connection, such that there is always a fixed rotational speed relationship between this planetary gear set and the input or output element of this shift element.

In connection with the coupling of a shift element to a shaft, with the formulation of "directly connected," it must be understood that the input or output element of the respective shift element is directly connected to the respective shaft through a torque-proof or torsionally flexible connection, such that there is always a fixed rotational speed relationship between this shaft and the input or output element of this shift element.

In connection with the coupling of a planetary gear set to another planetary gear set, the formulation "directly connected" must be understood to mean that one of the elements of the respective planetary gear set is directly connected to one of the elements of the respective other planetary gear set through a torque-proof or torsionally flexible connection, such that there is always a fixed rotational speed relationship between this shaft and the input or output element of this shift element.

Thereby, compared to the state of the art, the automatic transmission in accordance with the exemplary aspects of the invention features fully independent kinematics. Eleven forward gears and one reverse gear can be shifted with the use of the seven shift elements.

In a preferred first exemplary arrangement of the invention, it is proposed that the first element of the first planetary gear set is constantly connected to the third shaft in a torque-proof or torsionally flexible manner, that the third element of the first planetary gear set forms the fourth shaft of the automatic transmission and can be fixed to the transmission housing through the second shift element, and that the second element of the first planetary gear set is constantly connected to the sixth shaft in a torque-proof or torsionally flexible manner.

Here, the second shift element is arranged in the power flow between the fourth shaft and the transmission housing, such that the third element of the first planetary gear set can be fixed to the transmission housing through the second shift element. In addition, such automatic transmissions feature four clutch shafts, through which the four planetary gear sets are constantly connected to each other, namely the third shaft for the constant coupling of the first element of the first planetary gear set with the first element of the fourth planetary gear set, the fifth shaft for the constant coupling of the first element of the third planetary gear set with the third element of the second planetary gear set, the sixth shaft for the constant coupling of the second element of the first planetary gear set with the third element of the third planetary gear set along with the seventh shaft for the constant coupling of the first element of the second planetary gear set with the third element of the fourth planetary gear set.

In a preferred second exemplary arrangement of the invention, it is proposed that the third element of the first planetary gear set is constantly connected to the transmission housing in a torque-proof or torsionally flexible manner, that the first element of the first planetary gear set forms the fourth shaft of the automatic transmission and is connectable to the third shaft through the second shift element, and that the second element of the first planetary gear set is constantly connected to the sixth shaft in a torque-proof or torsionally flexible manner.

Here, the second shift element is arranged in the power flow between the third shaft and the fourth shaft, such that the first element of the first planetary gear set is connectable to the first element of the fourth planetary gear set through the second shift element. Since the fourth shaft can be fixed to the transmission housing through the first shift element, the third shaft or the first element of the first planetary gear set can be fixed to the transmission housing through the simultaneous engaging of the first and second shift element. In addition, such automatic transmission features three clutch shafts, through which the four planetary gear sets are constantly connected to each other, namely the fifth shaft for the constant coupling of the first element of the third planetary gear set with the third element of the second planetary gear set, the sixth shaft for the constant coupling of the second element of the first planetary gear set with the third element of the third planetary gear set along with the seventh shaft for the constant coupling of the first element of the second planetary gear set with the third element of the fourth planetary gear set.

In a preferred third exemplary arrangement of the invention, it is proposed that the third element of the first planetary gear set is constantly connected to the transmission housing in a torque-proof or torsionally flexible manner, that the first element of the first planetary gear set is constantly connected to the third shaft in a torque-proof or torsionally flexible manner, and that the second element of the first planetary gear set forms the fourth shaft of the automatic transmission and is connectable to the sixth shaft through the second shift element.

Here, the second shift element is arranged in the power flow between the fourth shaft and the sixth shaft, such that the second element of the first planetary gear set is connectable to the third element of the third planetary gear set through the second shift element. In addition, such automatic transmission features three clutch shafts, through which the four planetary gear sets are constantly connected to each other, namely the third shaft for the constant coupling of the first element of the first planetary gear set with the first element of the fourth planetary gear set, the fifth shaft for the constant coupling of the first element of the third planetary gear set with the third element of the second planetary gear set along with the seventh shaft for the constant coupling of the first element of the second planetary gear set with the third element of the fourth planetary gear set.

Preferably, with the transmission in accordance with exemplary aspects of the invention, four of the total of seven shift elements are engaged in any gear. Upon a change from one gear to the subsequent higher or lower gear, only one of the previously engaged shift elements is open and one previously open shift element is engaged, such that, upon each sequential upshift and downshift by one gear, so-called "group gearshifts" are avoided.

In order to represent at least eleven gears and at least one reverse gear, such a transmission may feature the following shifting logic or gear logic: in the first forward gear, the first, second, sixth and seventh shift elements are engaged or transfer torque. In the second forward gear, the first, second, third, and sixth shift elements are engaged or transfer torque. In the third forward gear, the first, second, fifth and sixth shift elements are engaged or transfer torque. In the fourth forward gear, the second, third, fifth, and sixth shift elements are engaged or transfer torque. In the fifth forward gear, the second, fourth, fifth and sixth shift elements are engaged or transfer torque. In the sixth forward gear, the second, third, fourth and fifth shift elements are engaged or transfer torque. In the seventh forward gear, the second, third, fourth, and sixth shift elements are engaged or transfer torque. In the eighth forward gear, the third, fourth, fifth and sixth shift elements are engaged or transfer torque. In the ninth forward gear, the first, third, fourth, and sixth shift elements are engaged or transfer torque. In the tenth forward gear, the first, third, fourth and fifth shift elements are engaged or transfer torque. In the eleventh forward gear, the first, fourth, fifth and sixth shift elements are engaged or transfer torque. In the reverse gear, the first, second, fourth and sixth shift elements are engaged or transfer torque.

In an advantageous manner, it is possible to, compared to the state of the art conforming to this type, also accommodate a seventh shift element in the same installation space or an installation space that is only a little larger than that required for the transmission conforming to this type with six shift elements.

In an advantageous manner, the kinematics in accordance with exemplary aspects of the invention of an automatic transmission with the direct connection of the fourth, fifth, sixth and seventh shift elements allows that not only the fifth and sixth shift elements may be arranged, viewed spatially, directly adjacent to each other, but also that the fourth, fifth and sixth shift elements may be arranged, viewed spatially, directly adjacent to each other. Moreover, the kinematics in accordance with exemplary aspects of the invention allows the fourth, fifth and seventh shift elements, or alternatively the fourth, fifth, sixth and seventh shift elements, to be arranged, viewed spatially, directly adjacent to each other. In an advantageous manner in terms of production technology, this allows the use of a common multi-disk carrier for the adjacent shift elements.

All four planetary gear sets may be designed as so-called "negative planetary gear sets," the respective planetary sets of which mesh with the sun gear and the ring gear of the respective planetary gear set.

As an alternative to the design of the gear set system with four individual negative planetary gear sets, an individual negative planetary gear set may be replaced by a so-called "positive planetary gear set." As is well known, a positive planetary gear set features a planetary gear carrier ("bar") with inner and outer planetary gears rotatably mounted on it, whereas each of the inner planetary gears meshes with each outer planetary gear and with the sun gear of the positive planetary gear set, while each of the outer planetary gears meshes with each inner planetary gear and with the ring gear of the positive planetary gear set. As an alternative to the design of the gear set system with four individual negative planetary gear sets, several of the negative planetary gear sets may also be replaced by positive planetary gear sets.

To ensure the same kinematics of the claimed gear set system, it is provided that the first element of each negative planetary gear set and the first element of each positive planetary gear set is formed as a sun gear, that the second element of each negative planetary gear set is formed as a planetary gear carrier, while the second element of each positive planetary gear set is formed as a ring gear, and that the third element of each negative planetary gear set is formed as a ring gear, while the third element of each positive planetary gear set is formed as a planetary gear carrier.

With respect to the spatial arrangement of the four planetary gear sets in the housing of the automatic transmission, in one embodiment it is proposed to arrange all four planetary gear sets coaxially next to each other in the defined order of "first, fourth, second, third planetary gear set," by which it is possible to, in a simple manner and with minimum leakage, supply all clutches with the means of pressure necessary for hydraulic actuation. For an application with a drive shaft and an output shaft that pass coaxially to each other, in this case, it is useful that the first planetary gear set is the planetary gear set of the planetary gear set group turned towards the input of the automatic transmission.

In conjunction with such order of planetary gear sets of "first, fourth, second, third planetary gear set," as an advantageous spatial arrangement of the shift elements, it is proposed to arrange the first shift element, viewed spatially, on that side of the first planetary gear set that is turned away from the fourth planetary gear set; depending on the kinematic connection of the second shift element at the other transmission components, to arrange the second shift element at least partly in an area radially around the first planetary gear set, or alternatively axially adjacent to the first planetary gear set on the side of the first planetary gear set turned away from the fourth planetary gear set, or alternatively in an area axially between the first and fourth planetary gear set, or alternatively axially adjacent to the third planetary gear set at least partly in an area axially between the second and third planetary gear set, or alternatively at least partly in an area radially around the third planetary gear set, or alternatively designed as a claw coupling at least partly in an area centrally within the first element of the first planetary gear set; to arrange the third shift element in an area axially between the second and fourth planetary gear set, or alternatively on the side of the third planetary gear set turned away from the first planetary gear set or alternatively axially adjacent to the second planetary gear set in an area axially between the second and third planetary gear set; to arrange the fourth shift element on the side of the second planetary gear set turned away from the fourth planetary gear set, or alternatively axially adjacent to the third planetary gear set in an area axially between the second and third planetary gear set, or alternatively in an area axially between the second and fourth planetary gear set, preferably axially adjacent to the second planetary gear set and/or to the fifth shift element and/or to the sixth shift element; to arrange the fifth shift element in an area axially between the second and fourth planetary gear set, preferably axially adjacent to the fourth planetary gear set and/or to the sixth shift element; to arrange the sixth shift element in an area axially between the second and fourth planetary gear set, preferably axially adjacent to the second planetary gear set and/or to the fifth shift element; and to arrange the seventh shift element in an area axially between the first and fourth planetary gear set, or alternatively in an area radially around the fourth planetary gear set, or alternatively in an area axially between the fourth and second planetary gear set (then preferably in an area radially around the fifth and/or the sixth shift element).

In practice, all proposed designs and arrangements for an automatic transmission in accordance with exemplary aspects of the invention feature, in particular for passenger cars, useful transmission ratios with very large overall spreads in terms of the gear gradation that is reasonable for drivability, which has positive effects on the intended low consumption of fuel. In addition, the automatic transmission in accordance with exemplary aspects the invention is characterized by, measured by the number of gears, a low number of shift elements and comparatively low construction costs. Furthermore, with the automatic transmission in accordance with exemplary aspects of the invention, a good degree of efficiency arises in all gears; on the one hand, this is a consequence of low drag losses, since four of the shift elements mesh in each gear; on the other hand, this is also the consequence of low gearing losses in the simply structured individual planetary gear sets.

In an advantageous manner, with the automatic transmission in accordance with exemplary aspects of the invention, it is possible to realize a start-up of the vehicle both with a start-up element external to the transmission and with a frictional shift element internal to the transmission. In a manner known per se, a start-up element external to the transmission may be formed as a hydrodynamic converter, as a so-called "dry start-up clutch," as a so-called "wet start-up clutch," as a magnetic powder clutch or as a centrifugal clutch. As an alternative to the arrangement of such a start-up element in the power flow between drive motor and the transmission, the start-up element external to the transmission may also be arranged in the power flow behind the transmission, whereas, in this case, the drive shaft of the transmission is constantly connected to the crank shaft of the drive motor in a torsion-proof or torsionally flexible manner. The first and second shift element, in particular the second shift element transferring torque in the multiple forward gears and in the reverse gear, is suitable, for example, as the start-up element internal to the transmission.

In addition, the automatic transmission in accordance with exemplary aspects of the invention is designed to enable adaptability to the various drive train arrangements both in the direction of the power flow and in spatial terms. Thus, with the same transmission diagram, depending on the stationary transmission ratio of the individual planetary gears, various gear jumps arise, such that an application-specific or vehicle-specific variation is made possible. Furthermore, without any special structural measures, it is possible to arrange the input and the output of the transmission either coaxially to each other or axially parallel to each other. An axle differential and/or a distributor differential may be arranged on the input side or on the output side of the transmission. It is also possible to provide additional freewheels at each suitable point of the multi-speed transmission, in particular by forming, if applicable, a connection between one shaft and the housing or by two shafts. Moreover, a wear-free brake such as a hydraulic or electric retarder or the like may be arranged at each shaft, preferably at the drive shaft or at the output shaft; this is of particular importance for use in commercial vehicles. Moreover, a power take-off may be provided for the drive of additional power units at each shaft, preferably at the drive shaft or the output shaft. An additional advantage of the automatic transmission in accordance with exemplary aspects of the invention is that an electric motor can be installed at each shaft as a generator and/or as an additional drive motor.

The shift elements that are used may be formed as power-shifting clutches or brakes. In particular, force-fitting clutches or brakes—such as multi-disk clutches, band brakes and/or cone clutches—may be used. Moreover, positive-locking brakes and/or clutches—such as synchronizations or claw couplinges—may be used as shift elements.

BRIEF DESCRIPTION OF THE DRAWINGS

In the following, the invention is more specifically described on the basis of the sample drawings. Thereby, the same or comparable components are provided with the same reference signs. The following is shown:

FIG. 4 an exemplary shift diagram for the transmission in accordance with FIG. 1 to FIG. 3;

FIG. 5 a table with variants of the transmission in accordance with FIG. 1 to FIG. 4;

DETAILED DESCRIPTION

Figure 1:
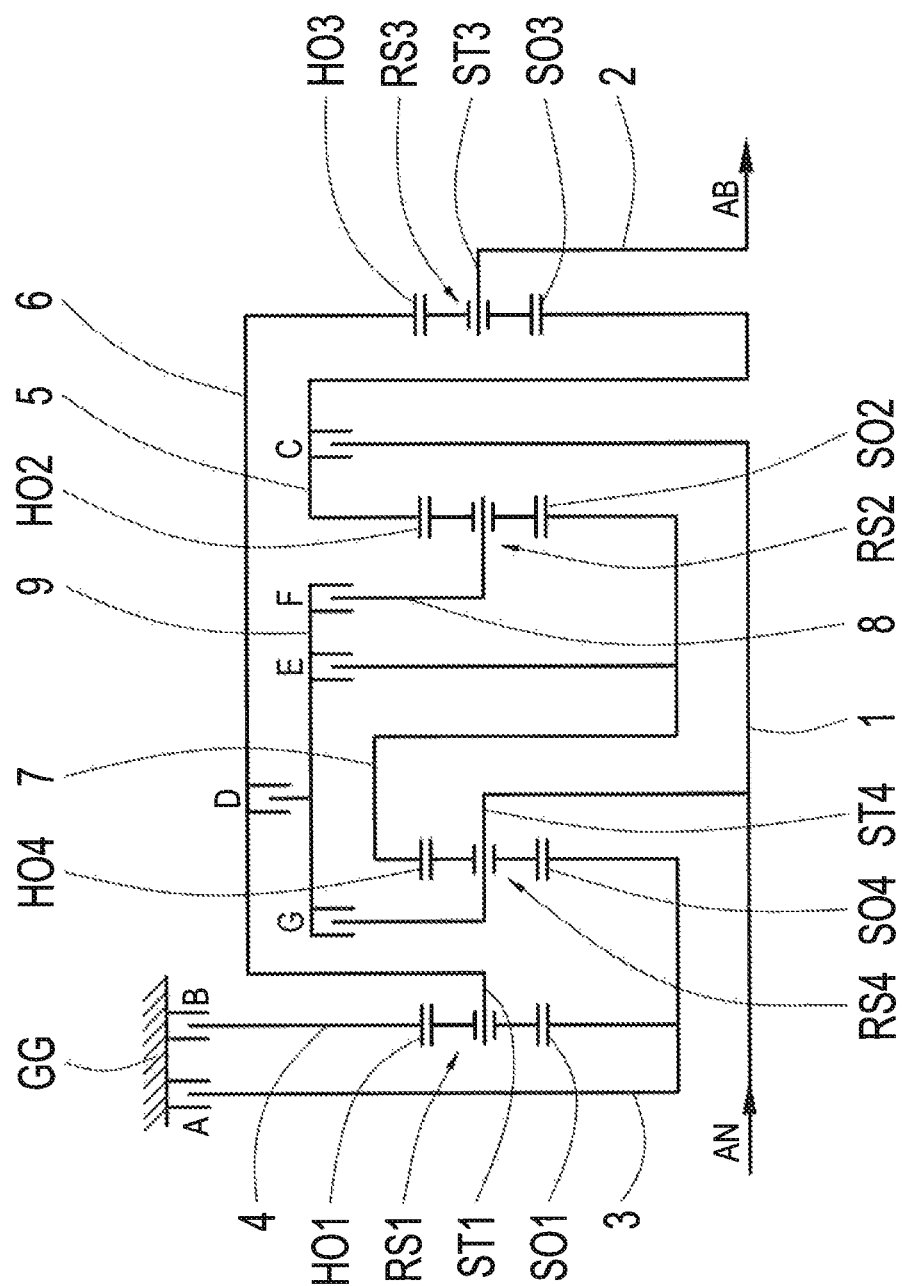
FIG. 1 a schematic presentation of a first exemplary embodiment of an automatic transmission in accordance with the invention.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 presents the gear set diagram of a first exemplary embodiment of an automatic transmission in accordance with the invention. The transmission comprises, inclusively, a drive shaft AN and an output shaft AB, nine rotatable shafts 1 to 9, four planetary gear sets RS1, RS2, RS3, RS4 and seven shift elements A, B, C, D, E, F, G, which are arranged in a housing GG of the transmission. All four planetary gear sets RS1, RS2, RS3, RS4 are formed as simple negative planetary gear sets, each of which comprises a first, a second and a third element. As is well known, a negative planetary gear features planetary gears that mesh with the sun gear and ring gear of the planetary set. Each of the third elements of the four planetary gear sets RS1, RS2, RS3, RS4 is formed as a ring gear and is designated with HO1, HO2, HO3 and HO4. Each of the first elements of the four planetary gear sets RS1, RS2, RS3, RS4 is formed as a sun gear and is designated with SO1, SO2, SO3, SO4. Each of the second elements of the four planetary gear sets RS1, RS2, RS3, RS4 is formed as a planetary gear carrier and is designated with ST1, ST2, ST3 and ST4. The planetary gears rotatably mounted on the planetary gear carriers ST1, ST2, ST3 and ST4 are designated with PL1, PL2, PL3 and PL4.

The shift elements A and B are formed as brakes, which in the exemplary embodiment shown are designed as frictional-locking, shiftable multi-disk brakes, and may also be designed in another arrangement as frictional-locking, shiftable bank brakes or, for example, as positive-locking, shiftable claw brakes or cone brakes. The additional shift elements C, D, E, F, and G are formed as clutches, which in the exemplary embodiment shown are all designed as a frictional-locking, shiftable multi-disk clutch, and may also be designed in another arrangement, for example, as a positive-locking, shiftable claw coupling or cone clutch. With this total of seven shift elements A to G, a selective shifting of eleven forward gears and one reverse gear can be realized, which will be described in more detail below on the basis of FIG. 2.

With respect to the coupling of the individual elements of the four planetary gear sets RS1, RS2, RS3 RS4 to each other, and to the drive shaft and output shaft AN, AB, with the exemplary embodiment in accordance with FIG. 1, the following is provided: the planetary gear carrier ST4 of the fourth planetary gear set RS4 and the drive shaft AN are connected to each other in a torsion-proof or torsionally flexible manner and form the first shaft of the automatic transmission, designated with 1. The planetary gear carrier ST3 of the third planetary gear set RS3 and the output shaft AB are connected to each other in a torque-proof or torsionally flexible manner and form the second shaft of the automatic transmission, designated with 2. The sun gear SO1 of the first planetary gear set RS1 and the sun gear SO4 of the fourth planetary gear set RS4 are constantly connected—in the manner of a first clutch shaft—to each other in a torque-proof or torsionally flexible manner. Here, together with the sun gear SO1 of the first planetary gear set RS1, the sun gear SO4 of the fourth planetary gear set RS4 forms the third shaft of the automatic transmission, designated with 3. The ring gear HO1 of the first planetary gear set RS1 forms the fourth shaft of the automatic transmission, designated with 4. The ring gear HO2 of the second planetary gear set RS2 and the sun gear SO3 of the third planetary gear set RS3 are constantly connected—in the manner of a second clutch shaft—to each other in a torque-proof or torsionally flexible manner. Here, together with the sun gear SO3 of the third planetary gear set RS3, the ring gear HO2 of the second planetary gear set RS2 forms the fifth shaft of the automatic transmission, designated with 5. The planetary gear carrier ST1 of the first planetary gear set RS1 and the ring gear HO3 of the third planetary gear set RS3 are constantly connected—in the manner of a third clutch shaft—to each other in a torque-proof or torsionally flexible manner. Here, together with the planetary gear carrier ST1 of the first planetary gear set, the ring gear HO3 of the third planetary gear set RS3 forms the sixth shaft of the automatic transmission, designated with 6. The ring gear HO4 of the fourth planetary gear set RS4 and the sun gear SO2 of the second planetary gear set RS2 are constantly connected to each other in a torque-proof or torsionally flexible manner and form—in the manner of a fourth clutch shaft—the seventh shaft of the automatic transmission, designated with 7. The planetary gear carrier ST2 of the second planetary gear set RS2 forms the eighth shaft of the automatic transmission, designated with 8. A ninth shaft of the automatic transmission, designated with 9, is provided; it is not directly connected to any of the four planetary gear sets RS1 to RS4.

With respect to the coupling of the seven shift elements A to G to the described nine shafts 1 through 9 of the transmission and to the transmission housing GG, with the automatic transmission in accordance with exemplary aspects of the invention shown in FIG. 1, the following is provided: the first shift element A is arranged in the power flow between the third shaft 3 and the transmission housing GG. The second shift element B is arranged in the power flow between the fourth shaft 4 and the transmission housing GG. The third shift element C is arranged in the power flow between the first shaft 1 and the fifth shaft 5. The fourth shift element D is arranged in the power flow between the sixth shaft 6 and the ninth shaft 9. The fifth shift element E is arranged in the power flow between the seventh shaft 7 and the ninth shaft 9. The sixth shift element F is arranged in the power flow between the eighth shaft 8 and the ninth shaft 9. The seventh shift element G is arranged in the power flow between the first shaft 1 and the ninth shaft 9. Thus, the ninth shaft 9 is constantly and directly connected to four shift elements, namely to the fourth, fifth, sixth, and seventh shift elements D, E, F, G.

Through the simultaneous engaging of the clutches E and F (viewed in the direction of the power flow, arranged in a row one behind the other), the second planetary gear set RS2 can be blocked. Here, in the blocked state, the sun gear SO2 and the planetary gear carrier ST2 are connected to each other, with the consequence that the sun gear SO2, the planetary gear carrier ST2 and the ring gear HO2 then rotate with the same rotational speed. Through the simultaneous engaging of the clutches D and E (viewed in the direction of the power flow, arranged in a row one behind the other), the sixth shaft 6 is connectable to the seventh shaft 7. Through the simultaneous engaging of the clutches D and F (viewed in the direction of the power flow, arranged in a row one behind the other), the sixth shaft 6 is connectable to the eighth shaft 8. Through the simultaneous engaging of the clutches G and F (viewed in the direction of the power flow, arranged in a row one behind the other), the first shaft 1 is connectable to the eighth shaft 8.

In the exemplary embodiment shown in FIG. 1, the four planetary gear sets RS1, RS2, RS3 RS4 are arranged, viewed in an axial direction, coaxially one behind the other in the defined order of "RS1, RS4, RS2, RS3," whereas the drive shaft AN and the output shaft AB are arranged coaxially to each other, and the first planetary gear set RS1 forms the gear set of the automatic transmission close to the drive and the third planetary gear set RS3 forms the gear set of the transmission close to the output. In an advantageous manner, such arrangement of "RS1, RS4, RS2, RS3" enables each of the four planetary gear sets RS1, RS2, RS3, RS4 to be reached through centrically in an axial direction only by a maximum of one shaft of the automatic transmission.

In principle, the spatial arrangement of the shift elements within the transmission is arbitrary, and is limited only by the dimensions and the external shaping of the transmission housing GG. Accordingly, the arrangement of components shown in FIG. 1 is expressly understood to be just one of many variants of the arrangement of the components. The specialist can find numerous suggestions for this in, for example, the aforementioned document DE 10 2005 002 337 A1. Based on the transmission structure, the exemplary embodiment shown in FIG. 1 is particularly well-suited for installation in a motor vehicle with a so-called "standard drive." The arrangement of components shown in FIG. 1 is based on the automatic transmission disclosed in FIG. 4 of DE 10 2005 002 337 A1.

As shown in FIG. 1, the two planetary gear sets RS1 and RS4 are directly adjacent to each other. In the exemplary embodiment shown, the brake A is arranged, viewed spatially, axially next to the first planetary gear set RS1 (arranged on the input side of the transmission housing), on the side of the planetary gear set RS1 that is turned away from the planetary gear set RS4. The brake A is arranged on a relatively large diameter, on a diameter larger than the diameter of the ring gear HO1. In a simple manner, the brake A may be supplied with means of pressure and coolant by the transmission housing GG. In a structurally simple manner, the brake A may be integrated into a housing wall of the transmission housing GG close to the drive.

As also shown in FIG. 1, at least the multi-disk pack of the brake B is arranged, viewed spatially, in an area radially around the first planetary gear set RS1. In a simple manner, the brake B may be supplied with coolant and lubricant by the transmission housing GG. In a structurally simple manner, the brake B may be integrated into the transmission housing GG or in a housing wall of the transmission housing GG close to the drive.

As also shown in FIG. 1, the clutch C is arranged, viewed spatially, in an area axially between the third planetary gear set RS3 (arranged on the output side of the transmission housing) and the second planetary gear set RS2 (turned towards the third planetary gear set RS3), thereby adjacent axially and directly at the second planetary gear set RS2. In an advantageously simple manner, the clutch C may be supplied with coolant and lubricant by the drive shaft AN with minimum leakage loss.

As also shown in FIG. 1, the clutches C, E, and F are arranged, viewed spatially, in an area axially between the second planetary gear set RS2 and the fourth planetary gear set RS4 (arranged on the side of the second planetary gear set RS2 turned away from the third planetary gear set RS3). The clutches E and F are arranged axially next to each other (for example), whereas the clutch F is arranged axially and directly at the second planetary gear set RS2, while the clutch D is arranged, viewed spatially, in an area radially above the clutches E, F near the fourth planetary gear set RS3. In an advantageous manner in terms of production technology, at least for the two clutches E and F, a common multi-disk carrier is provided; it forms one section of the ninth shaft 9 and may simultaneously be formed as the multi-disk carrier of the clutch D. In a structurally simple manner, the clutch D, for example, may be supplied with coolant and lubricant by the output shaft AB with minimum leakage loss, through the planetary gear carrier ST3 of the third planetary gear set RS3 constantly connected to the output shaft AB. The clutch E, for example, may be supplied with means of pressure and lubricant by the drive shaft AN arriving through the planetary gear carrier ST2 of the second planetary gear set rotatably mounted on the drive shaft AN.

As also shown in FIG. 1, the clutch G is arranged, viewed spatially, in an area axially between the first planetary gear set RS3 (arranged on the input side of the transmission housing) and the fourth planetary gear set RS4 (constantly connected to the drive shaft AN), thereby adjacent axially and directly at the fourth planetary gear set RS4. In an advantageously simple manner, the clutch C may be supplied with means of pressure and lubricant by the drive shaft AN with minimum leakage loss. In an advantageous manner in terms of production technology, such multi-disk carrier of the clutch G that forms one section of the ninth shaft 9 also, together with that multi-disk carrier of the clutch D that likewise forms one section of the ninth shaft 9, may be designed as a common component. Moreover, the common multi-disk carrier provided for the two clutches E and F may also be designed as a multi-disk carrier of the clutch G.

As already indicated, the spatial arrangement of the shift elements shown in FIG. 1 must be understood as an example. By way of derogation from FIG. 1, for example, the clutch C may be arranged in a manner axially adjacent to the fourth planetary gear set RS4 in an area axially between the second and fourth planetary gear sets RS2, RS4, which allows for the option of arranging at least the multi-disk packs of all five clutches in the area axially between the second and fourth planetary gear sets RS2, RS4. By way of derogation from FIG. 1, for example, it may also be provided that the clutch D may be arranged in a manner axially adjacent to the second planetary gear set RS2 in an area axially between the second and third planetary gear sets RS2, RS3, by which the actuating device for the clutch D is comparably easy to realize in terms of design. Alternatively, the multi-disk pack of the clutch D may also be arranged in an area radially around the clutch F. By way of derogation from FIG. 1, it may also be provided, for example, that the clutch G is arranged, viewed spatially, in an area radially around the second planetary gear set RS2. Alternatively, the multi-disk pack of the clutch G may also be arranged in an area radially around the clutch E axially between the fourth and second planetary gear sets RS4, RS2.

As also shown in FIG. 1, each of the planetary gear sets RS1, RS4 and RS2 is completely reached through centrically in an axial direction only by the drive shaft AN (or the shaft 1). This is advantageous for the dimensioning of the drive shaft AN and the gear sets, but is also advantageous for the structural arrangement of the lubricant feed to the planetary gears of the four planetary gear sets RS1 to RS4 and for the structural arrangement of the means of pressure and lubricant feed to the clutches. Thereby, in its axial progression, the drive shaft AN reaches through the third shaft 3 and the seventh shaft 7. As also shown in FIG. 1, in its axial progression, the shaft 6 of the transmission, which forms the operative connection between the planetary gear carrier ST1 of the first planetary gear set RS1 (arranged on the input side of the transmission housing) and the ring gear HO3 of the third planetary gear set RS3 (arranged on the output side of the transmission housing), completely reaches beyond the second and fourth planetary gear sets RS2, RS4 along with all five clutches C, D, E, F, G.

Figure 2:
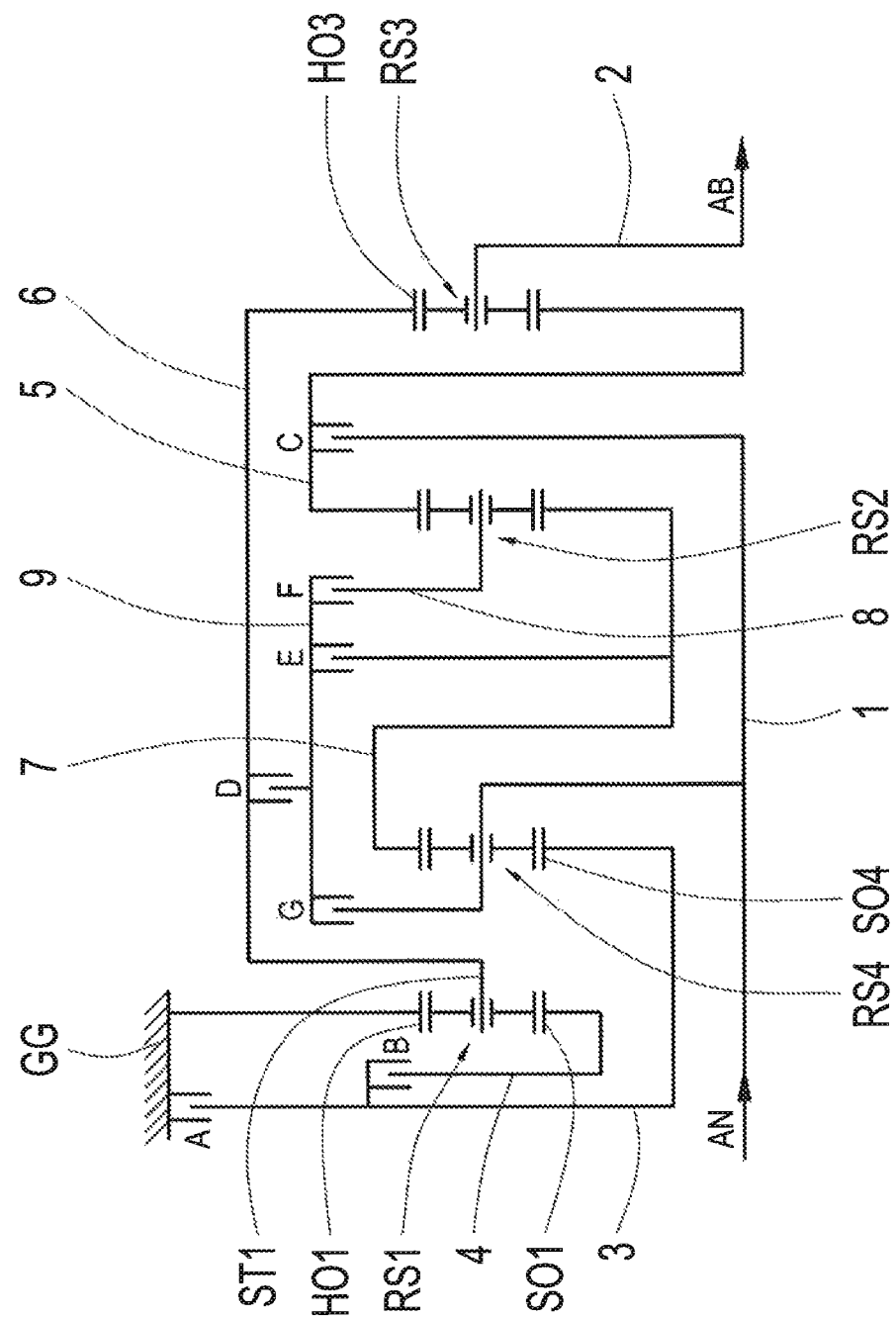
FIG. 2 a schematic presentation of a second exemplary embodiment of an automatic transmission in accordance with the invention.

FIG. 2 shows the gear set diagram of a second exemplary embodiment of the automatic transmission in accordance with the invention, derived from the transmission diagram in accordance with FIG. 1. The differences with the transmission diagram in accordance with FIG. 1 concern only the kinematic coupling of the first planetary gear set RS1 and the second shift element B to the other transmission components.

As shown in FIG. 2, the ring gear HO1 of the first planetary gear set RS1 is now constantly connected to the transmission housing GG in a torque-proof or torsionally flexible manner. Similar to FIG. 1, the sun gear SO4 of the fourth planetary gear set RS4 forms the third shaft 3 of the automatic transmission. The sun gear SO1 of the first planetary gear set RS1 now forms the fourth shaft 4 of the automatic transmission constantly and directly connected to the second shift element B. Such fourth shaft 4 is now connectable to the third shaft 3 of the automatic transmission through the second shift element B, now formed as a clutch. As in FIG. 1, the ring gear of the third planetary gear set RS3, as the sixth shaft 6 of the automatic transmission, is constantly connected to both the clutch B and to the planetary gear carrier ST1 of the first planetary gear set RS1. In contrast to the automatic transmission in accordance with FIG. 1, with the automatic transmission in accordance with FIG. 2, the second shift element is arranged in the power flow between the fourth shaft 4 (now the sun gear SO1 of the first planetary gear set RS1) and the third shaft 3 (the sun gear SO4 of the fourth planetary gear set RS4). Thus, the sun gears SO1 and SO4 are connectable to each other through the engaging of the second shift element B, while the sun gears SO1 and SO4 can be fixed to the transmission housing GG through the simultaneous engaging of the first shift element A and the second shift element B.

Thus, in contrast to the automatic transmission in accordance with FIG. 1, the automatic transmission in accordance with FIG. 2 features only three clutch shafts, through which the individual planetary gear sets are constantly connected to each other, namely the fifth shaft 5 for the constant coupling of the sun gear SO3 of the third planetary gear set RS3 with the ring gear HO2 of the second planetary gear set RS2, the aforementioned sixth shaft 6 for the constant coupling of the planetary gear carrier of the first planetary gear set RS1 with the ring gear HO3 of the third planetary gear set RS3 along with the seventh shaft 7 for the constant coupling of the sun gear SO2 of the second planetary gear set RS2 with the ring gear HO4 of the fourth planetary gear set RS4.

As also shown in FIG. 2, all four planetary gear sets RS1 to RS4 are formed, as in FIG. 1, as simple negative planetary gear sets, and are arranged, viewed spatially, coaxially next to each other with the defined order of "first, fourth, second, third planetary gear set" (thus, the arrangement of "RS1-RS4-R52-R53"). Moreover, the spatial arrangement of the shift element A designed as a brake and the spatial arrangement of the five shift elements C to G designed as clutches were taken from FIG. 1 without any change.

In contrast to FIG. 1, the brake A and the clutch B are arranged, viewed spatially, axially next to the first planetary gear set RS1, on the side of the planetary gear set RS1 that is turned away from the planetary gear set RS4. The brake A is arranged, without any change, on a relatively large diameter in the area of the outer diameter of the transmission housing GG, and may be supplied with means of pressure and coolant by the transmission housing GG in a simple manner. Viewed spatially, the clutch B is arranged axially between the inner multi-disk carrier of brake A and the first planetary gear set RS1. The clutch B may be supplied with means of pressure and coolant, for example, by the drive shaft AN through the third shaft 3 radially enclosing the drive shaft AN.

If, by way of derogation from FIG. 2, the clutch B is formed as a claw coupling, this may also be arranged, viewed spatially, at least partially centrically within the sun gear SO1 of the first planetary gear set RS1, and thereby may radially enclose one section of the third shaft 3.

Figure 3:
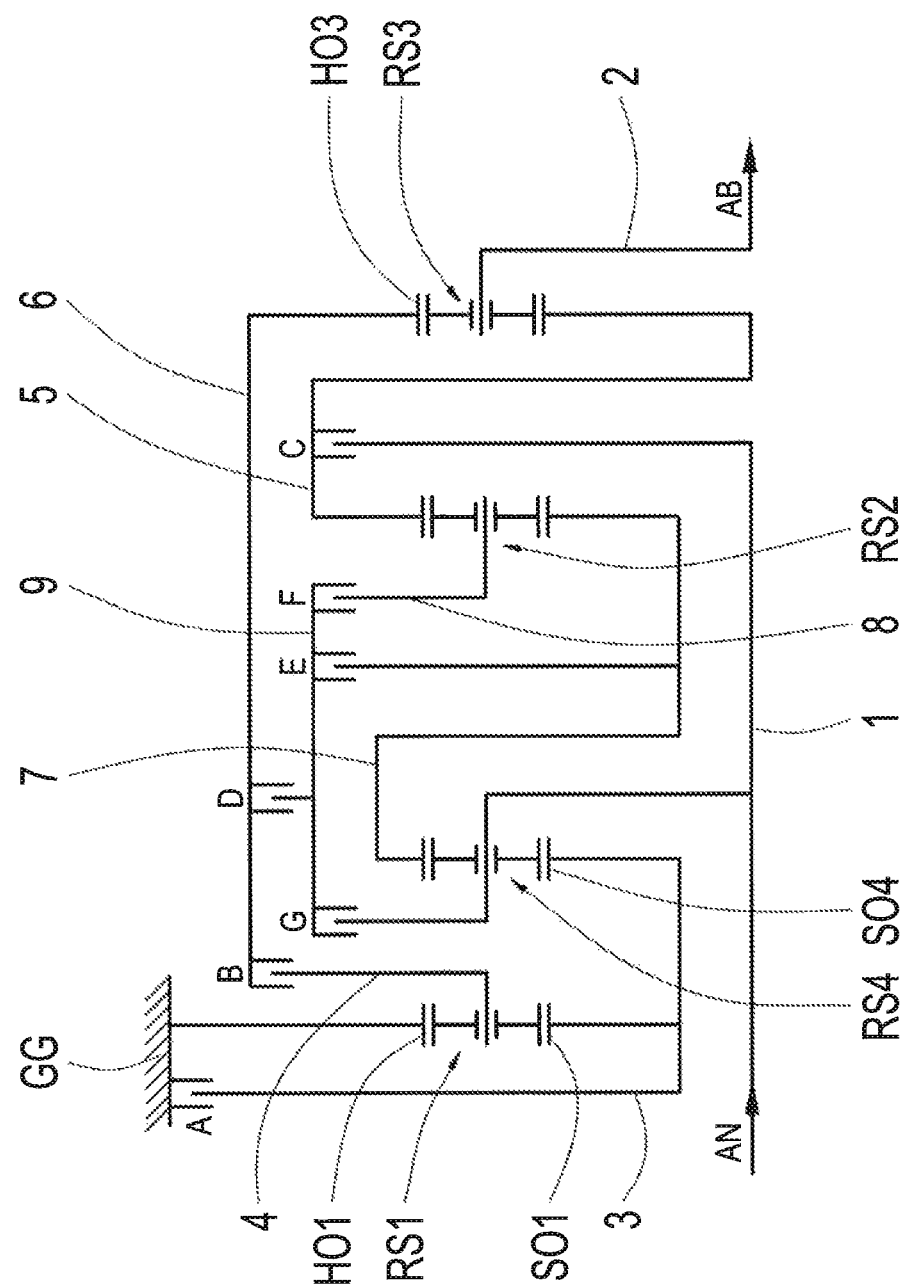
FIG. 3 a schematic presentation of a third exemplary embodiment of an automatic transmission in accordance with the invention.

FIG. 3 shows the gear set diagram of a third exemplary embodiment of the automatic transmission in accordance with the invention, likewise derived from the transmission diagram in accordance with FIG. 1. The differences with the transmission diagram in accordance with FIG. 1 in turn relates to only the kinematic coupling of the first planetary gear set RS1 and the second shift element B to the other transmission components.

As shown in FIG. 3, the ring gear HO1 of the first planetary gear set RS1 is now constantly connected to the transmission housing GG in a torque-proof or torsionally flexible manner. As shown in FIG. 1, the sun gear SO4 of the fourth planetary gear set RS4 is, as the third shaft 3 of the automatic transmission, constantly connected to the sun gear SO1 of the first planetary gear set RS1, such that the sun gears SO1 and SO4 together can be fixed to the transmission housing GG through the engaging of the first shift element A. The planetary gear carrier ST1 of the first planetary gear set RS1 now forms the fourth shaft 4 of the automatic transmission constantly connected to the second shift element B. This fourth shaft 4 is now connectable to the sixth shaft 6 of the automatic transmission through the second shift element B now formed as a clutch, whereas the sixth shaft 6 on its part is formed by the ring gear HO3 of the third planetary gear set RS3 and is constantly connected to the clutch D. In contrast to the automatic transmission in accordance with FIG. 1, with the automatic transmission in accordance with FIG. 3, the second shift element is arranged in the power flow between the fourth shaft 4 (now the planetary gear carrier ST1 of the first planetary gear set RS1) and the sixth shaft 6 (the ring gear HO3 of the third planetary gear set RS3).

Thus, in contrast to the automatic transmission in accordance with FIG. 1, the automatic transmission in accordance with FIG. 3 features only three clutch shafts, through which the individual planetary gear sets are constantly connected to each other, namely the aforementioned third shaft 3 for the constant coupling of the sun gear SO1 of the first planetary gear set RS1 with the sun gear SO4 of the fourth planetary gear set RS4, the fifth shaft 5 for the constant coupling of the sun gear SO3 of the third planetary gear set RS3 with the ring gear HO2 of the second planetary gear set RS2 along with the seventh shaft 7 for the constant coupling of the sun gear SO2 of the second planetary gear set RS2 with the ring gear HO4 of the fourth planetary gear set RS4.

As also shown in FIG. 3, all four planetary gear sets RS1 to RS4 are formed, as in FIG. 1, as simple negative planetary gear sets, and are arranged, viewed spatially, coaxially next to each other with the defined order of "first, fourth, second, third planetary gear set" (thus, the arrangement of "RS1-RS4-RS2-RS3"). Moreover, the spatial arrangement of the shift element A designed as a brake and the spatial arrangement of the five shift elements C to G designed as clutches were taken from FIG. 1 without any change.

In contrast to FIG. 1, the clutch B is arranged, viewed spatially, in an area axially between the first planetary gear set RS1 and the fourth planetary gear set RS4. The clutch B may be supplied with means of pressure and coolant, for example, by the drive shaft AN through the third shaft 3 radially enclosing the drive shaft AN and the planetary gear carrier ST1 of the first planetary gear set RS1 radially enclosing the third shaft 3.

If, by way of derogation from FIG. 3, the clutch B is formed as a claw coupling, this may also be arranged, viewed spatially, on a small diameter in the area axially between the sun gears SO1 and SO4, and thereby may radially enclose this section of the third shaft 3.

FIG. 4 presents an exemplary shift diagram of the automatic transmission in accordance with the invention in accordance with FIGS. 1 to 3. In each gear, four shift elements are engaged and only three shift elements are open, which has very positive effects on the degree of efficiency of the transmission. In addition to the gear shift logic, it may also be taken from the shift diagram that, upon a sequential shifting operation, thus upon upshifts and downshifts by one gear, so-called "group gearshifts" can be avoided, since two gears adjacent in the shifting logic always jointly use two shift elements. The first forward gear is particularly well-suited as a so-called "crawler," with a smaller overall transmission ratio for a large pulling force. The eighth forward gear is formed as a direct gear, such that three forward gears of an overdrive nature are available.

Based on the finding that, in principle, it is possible to replace a so-called "negative planetary gear set" with a kinematically equivalent positive planetary gear set, to the extent that space allows for the coupling the sun gear, planetary gear carrier and ring gear of such planetary gear set to the other planetary gear sets and shift elements and, where appropriate, to the housing, FIG. 5 shows a table in which technically meaningful combinations of types of planetary gear sets for the transmission diagrams shown in FIGS. 1 to 3 are listed. All of the variants listed in the table may shift, through the shifting logic shown in FIG. 4, eleven forward gears and one reverse gear.

As is well known, with a negative planetary gear set, each of its planetary gears meshes with both the sun gear and the ring gear, while, with a positive planetary gear set, each of its inner planetary gears meshes with one of its outer planetary gears and the sun gear, and each of its outer planetary gears meshes with one of its inner planetary gears and the ring gear. FIG. 5 shows that it is not technically sensible to design the third planetary gear set RS3 constantly connected to the output shaft as a positive planetary gear set, while the formation of one or more of the other three planetary gear sets RS1, RS2 and RS4 leads to technically usable results. Two examples of such variation options are described in more detail below.

Figure 6:
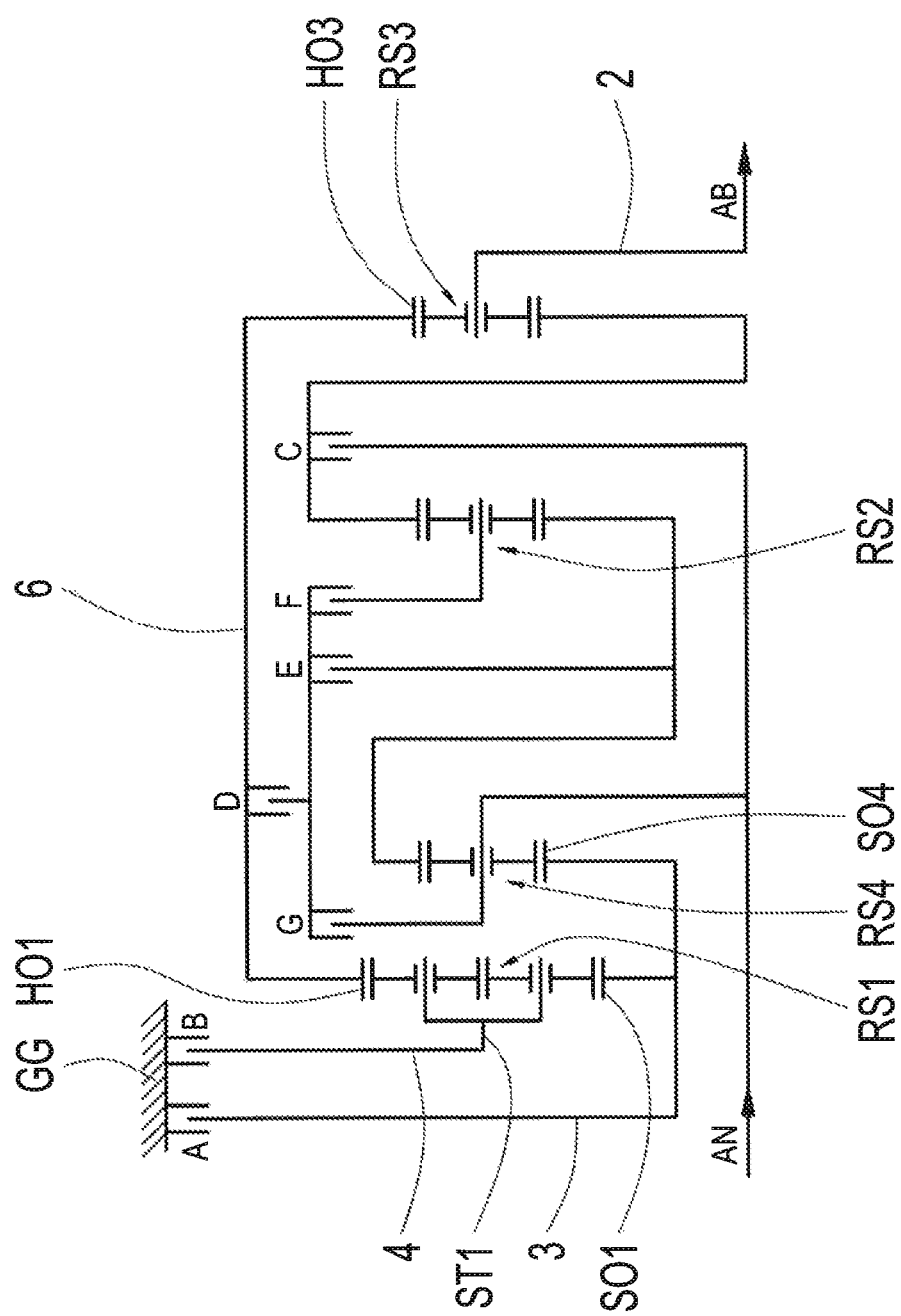
FIG. 6 a schematic presentation of a first exemplary alternative to the transmission in accordance with FIG. 1.

FIG. 6 shows a schematic representation of a first alternative to the transmission diagram shown in FIG. 1. In contrast to the transmission diagram in accordance with FIG. 1, with which all four planetary gear sets are designed as negative planetary gear sets, in the transmission diagram in accordance with FIG. 6, the first planetary gear set RS1 is designed as a positive planetary gear set, while the other three planetary gear sets RS2, RS3, RS4 are designed as planetary gear sets, without any change. Viewed spatially, the sequence of the four individual planetary gear sets in FIG. 6, arranged coaxially adjacent to each other, is unchanged in respect of FIG. 1, and this is likewise the case for the spatial arrangement of all seven shift elements A to G, such that, in order to avoid repetitions, only the major differences from FIG. 1 need further clarification in the description of FIG. 6.

In order to maintain the kinematics of the gear set system in accordance with FIG. 1, the following is provided in FIG. 6: without any change, the sun gear SO1 forms the first element of the first planetary gear set RS1, which is constantly and directly connected to both the sun gear SO4 of the fourth planetary gear set RS4 and the brake A through the third shaft 3 of the automatic transmission (which acts as the first clutch shaft), thus can be fixed to the transmission housing GG through this brake A (together with the sun gear SO4). The ring gear HO1 now forms the second element of the first planetary gear set RS1, which is constantly connected to the third element (ring gear HO3) of the third planetary gear set RS3 and the clutch D through the sixth shaft 6 (which acts as the third clutch shaft). The planetary gear carrier ST1 now forms the third element of the first planetary gear set RS1, which is constantly and directly connected to the brake B and can be fixed to the transmission housing GG through such brake B.

Figure 7:
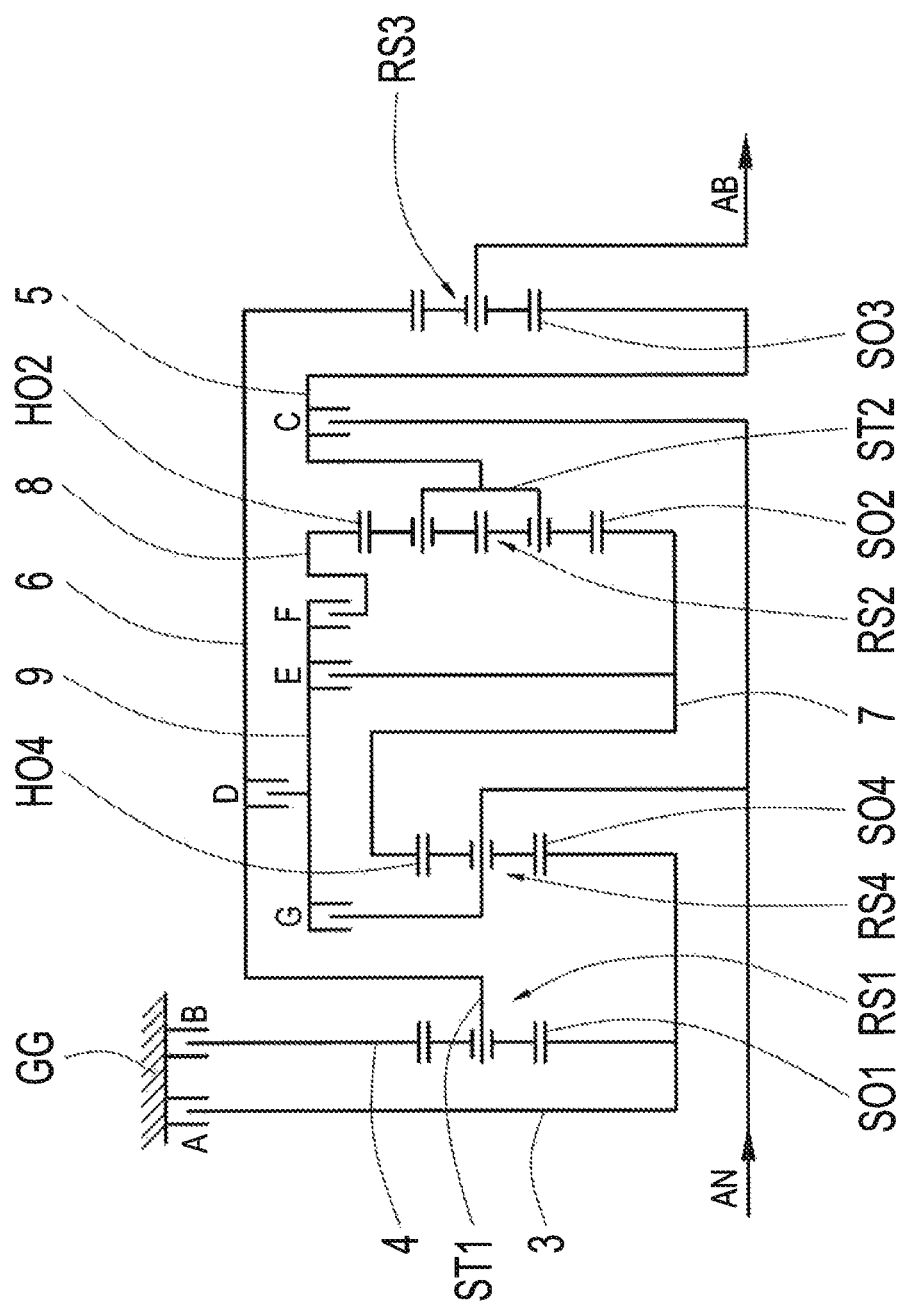
FIG. 7 a schematic presentation of a second exemplary alternative to the transmission in accordance with FIG. 1.

FIG. 7 shows a schematic representation of a second alternative to the transmission diagram shown in FIG. 1. In contrast to the transmission diagram in accordance with FIG. 1, with which all four planetary gear sets are designed as negative planetary gear sets, in the transmission diagram in accordance with FIG. 7, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 7, arranged coaxially adjacent to each other, is unchanged in respect of FIG. 1, and this is likewise the case for the spatial arrangement of all seven shift elements A to G, such that, in order to avoid repetitions, only the major differences from FIG. 1 need further clarification in the description of FIG. 7.

In order to maintain the kinematics of the gear set system in accordance with FIG. 1, the following is provided in FIG. 7: without any change, the sun gear SO2 forms the first element of the second planetary gear set RS2, which is constantly connected to the third element (ring gear HO4) of the fourth planetary gear set RS4 and the clutch E through the seventh shaft 7 of the automatic transmission (which acts as the fourth clutch shaft) and is connectable to the ninth shaft 9 of the automatic transmission through such clutch E. The ring gear HO2 now forms the second element of the second planetary gear set RS2, which, as the eighth shaft 8 of the automatic transmission, is constantly and directly connected to the clutch F and is connectable to the ninth shaft 9 through such clutch F. The planetary gear carrier ST2 now forms the third element of the second planetary gear set RS2, which, as the fifth shaft 5 of the automatic transmission (and as the second clutch shaft), is directly and constantly connected to both the clutch C and the first element (sun gear SO3) of the third planetary gear set RS3, and is connectable to the first shaft 1 (drive shaft AN) through this clutch C. If the second planetary gear set RS2 is blocked, such that all three elements of the planetary gear set RS2 rotate with the same rotational speed, the clutches E and F, which are arranged in a row one behind the other in the direction of the power flow, must be engaged at the same time, by which the sun gear SO2 and the ring gear HO2 of the second planetary gear set RS2 are then connected to each other.

Figure 10:
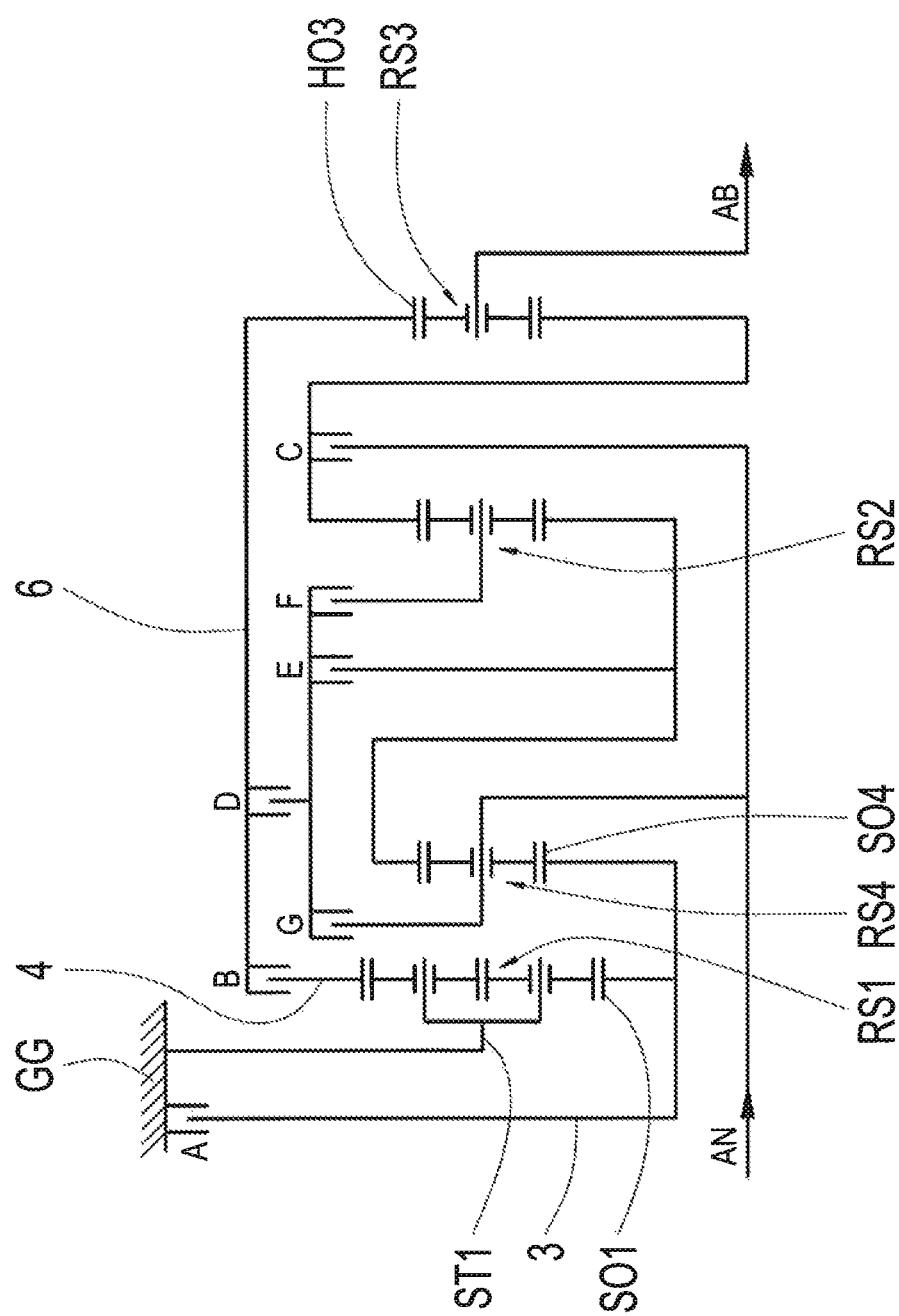
FIG. 10 a schematic presentation of a first exemplary alternative to the transmission in accordance with FIG. 3.

In knowledge of these two alternatives, described as examples, to the transmission diagram shown in FIG. 1, the specialist will easily generate alternatives with several positive planetary gear sets other than those listed in the table of FIG. 10. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

The possibilities of replacing one of the negative planetary gear sets with a positive planetary gear set, as previously described with the example of the transmission kinematics in accordance with FIG. 1, can also be transferred to the transmission kinematics in accordance with FIG. 2 and the transmission kinematics in accordance with FIG. 3. The same applies to the replacement of several of the negative planetary gear sets with positive planetary gear sets. This is to be described in more detail below on the basis of FIGS. 8 to 11.

Figure 8:
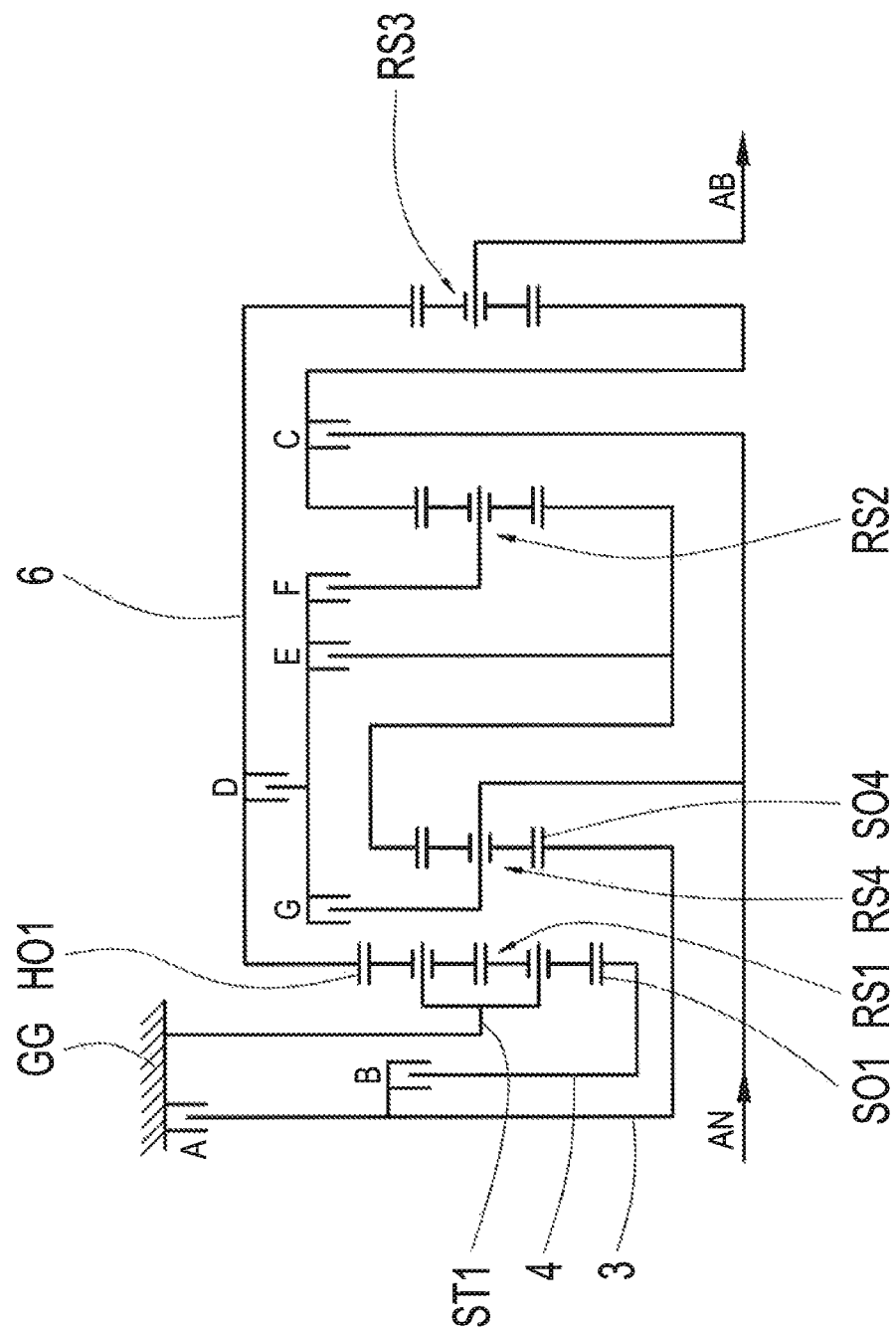
FIG. 8 a schematic presentation of a first exemplary alternative to the transmission in accordance with FIG. 2.

FIG. 8 shows a schematic representation of a first alternative to the transmission diagram shown in FIG. 2. In contrast to the transmission diagram in accordance with FIG. 2, with which all four planetary gear sets are designed as negative planetary gear sets, in the transmission diagram in accordance with FIG. 8, the first planetary gear set RS1 is designed as a positive planetary gear set, while the other three planetary gear sets RS2, RS3, RS4 are designed as planetary gear sets, without any change. Viewed spatially, the sequence of the four individual planetary gear sets in FIG. 8, arranged coaxially adjacent to each other, is unchanged in respect of FIG. 2, and this is likewise the case for the spatial arrangement of all seven shift elements A to G, such that, in order to avoid repetitions, only the major differences from FIG. 2 need further clarification in the description of FIG. 8.

In order to maintain the kinematics of the gear set system in accordance with FIG. 2, the following is provided in FIG. 8: without any change, the sun gear SO1 forms the first element of the first planetary gear set RS1, which, as the fourth shaft 4 of the automatic transmission, is constantly and directly connected to the clutch B and is connectable to the third shaft 3 of the automatic transmission through such clutch B. The first element of the fourth planetary gear set RS4 forms such third shaft 3, which is constantly and directly connected to the brake B. The ring gear HO1 now forms the second element of the first planetary gear set RS1, which is constantly connected to both the third element (ring gear HO3) of the third planetary gear set RS3 and the clutch D through the sixth shaft 6 (which acts as the second clutch shaft). The planetary gear carrier ST1 now forms the third element of the first planetary gear set RS1, which is constantly fixed on the transmission housing GG.

Figure 9:
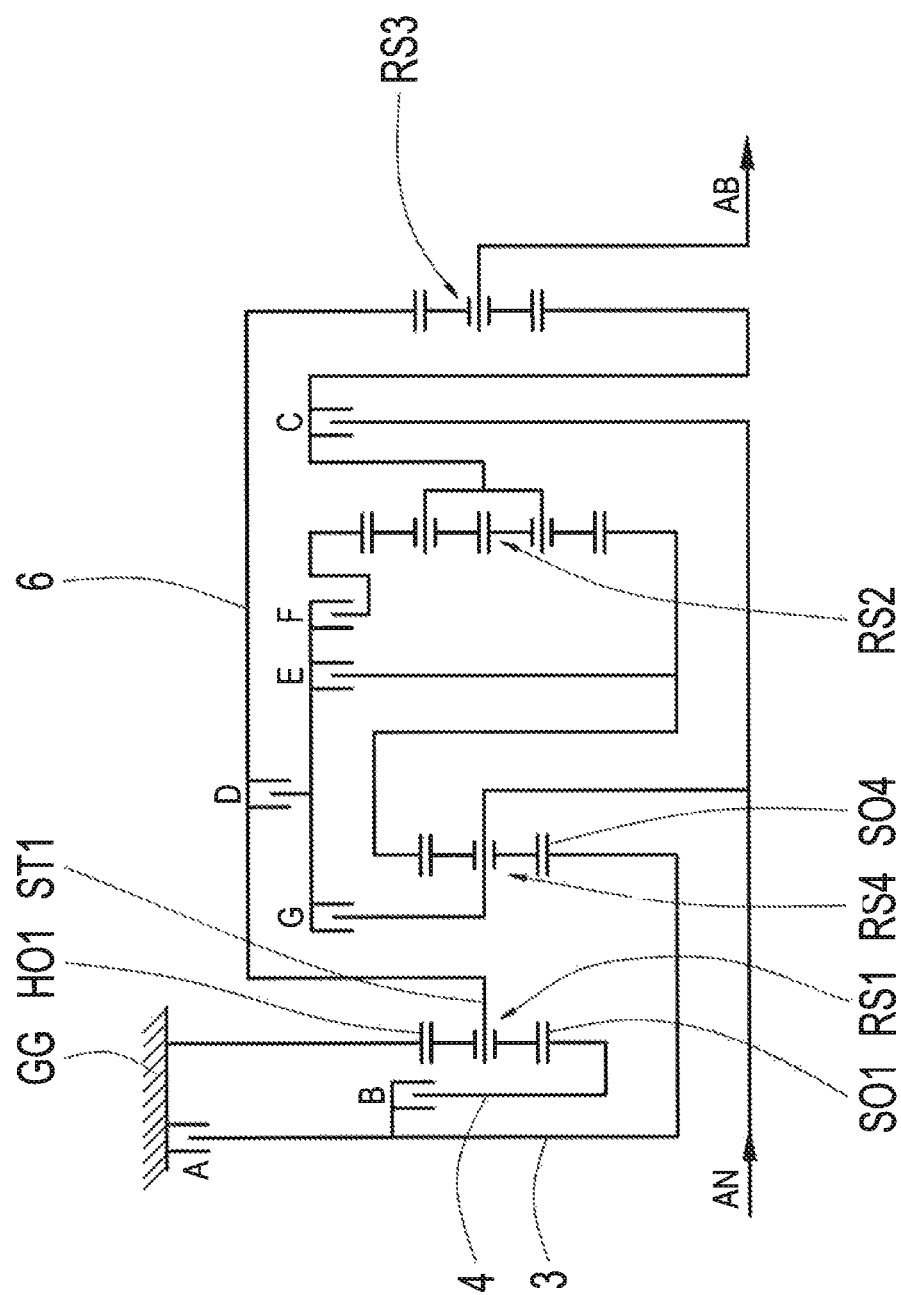
FIG. 9 a schematic presentation of a second exemplary alternative to the transmission in accordance with FIG. 2.

FIG. 9 shows a schematic representation of a second alternative to the transmission diagram shown in FIG. 2. In contrast to the transmission diagram in accordance with FIG. 2, with which all four planetary gear sets are designed as negative planetary gear sets, in the transmission diagram in accordance with FIG. 9, the second planetary gear set RS2 is designed as a positive planetary gear set, while the other three planetary gear sets RS1, RS3, RS4 are designed as planetary gear sets, without any change. Viewed spatially, the sequence of the four individual planetary gear sets in FIG. 9, arranged coaxially adjacent to each other, is unchanged in respect of FIG. 2, and this is likewise the case for the spatial arrangement of all seven shift elements A to G.

The structural adjustments caused by the transposition of the connection of the planetary gear carrier and ring gear of the positive planetary gear set in respect of the negative planetary gear set were already described on the basis of FIG. 7 and therefore do not require repeating at this point, with the exception of the reference that the fifth shaft 5 in the transmission diagram in accordance with FIG. 9 acts as the first clutch shaft (and not as the second clutch shaft as in FIG. 7), and that the seventh shaft 7 in the transmission diagram in accordance with FIG. 9 acts as the third clutch shaft (and not as the fourth clutch shaft as in FIG. 7).

In knowledge of these two alternatives, described as examples, to the transmission diagram shown in FIG. 2, the specialist will easily generate alternatives with several positive planetary gear sets other than those listed in the table of FIG. 5. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

FIG. 10 shows a schematic representation of a first alternative to the transmission diagram shown in FIG. 3. In contrast to the transmission diagram in accordance with FIG. 3, with which all four planetary gear sets are designed as negative planetary gear sets, in the transmission diagram in accordance with FIG. 10, the first planetary gear set RS1 is designed as a positive planetary gear set, while the other three planetary gear sets RS2, RS3, RS4 are designed as planetary gear sets, without any change. Viewed spatially, the sequence of the four individual planetary gear sets in FIG. 10, arranged coaxially adjacent to each other, is unchanged in respect of FIG. 3, and this is likewise the case for the spatial arrangement of all seven shift elements A to G, such that, in order to avoid repetitions, only the major differences from FIG. 3 need further clarification in the description of FIG. 10.

In order to maintain the kinematics of the gear set system in accordance with FIG. 3, the following is provided in FIG. 10: without any change, the sun gear SO1 forms the first element of the first planetary gear set RS1, which is constantly and directly connected to both the sun gear SO4 of the fourth planetary gear set RS4 and the brake A through the third shaft 3 of the automatic transmission (which acts as the first clutch shaft), and thus can be fixed to the transmission housing GG through such brake A (together with the sun gear SO4). The ring gear HO1 now forms the second element of the first planetary gear set RS1, which, as the fourth shaft 4 of the automatic transmission, is constantly connected to the clutch B and is connectable to the sixth shaft 6 of the automatic transmission through such clutch B. The third element (ring gear HO3) of the third planetary gear set RS3 forms such sixth shaft 6, which is also constantly connected to the clutch D. The planetary gear carrier ST1 now forms the third element of the first planetary gear set RS1, which is constantly fixed on the transmission housing GG.

Figure 11:
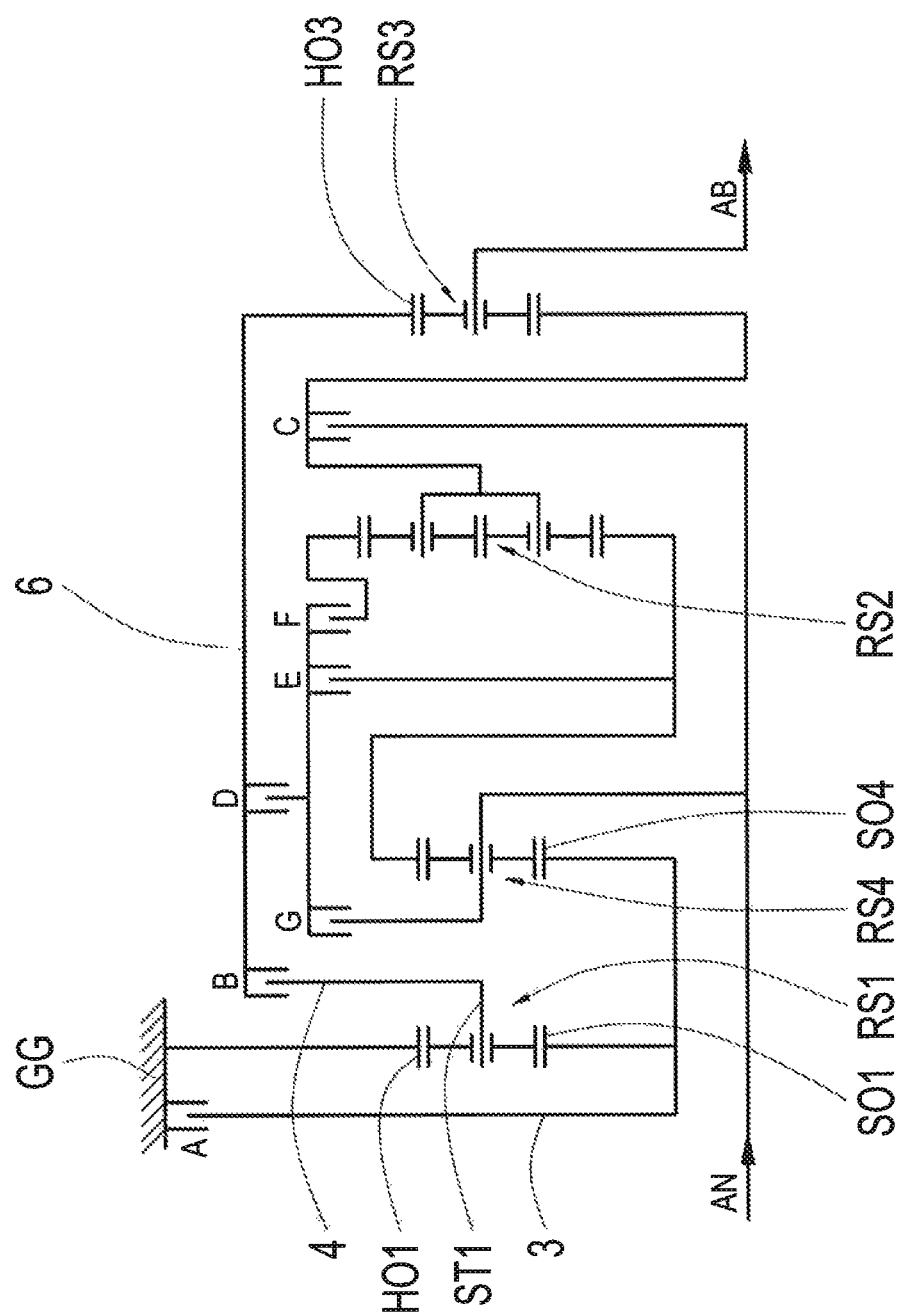
FIG. 11 a schematic presentation of a second exemplary alternative to the transmission in accordance with FIG. 3.

FIG. 11 shows a schematic representation of a second alternative to the transmission diagram shown in FIG. 3. In contrast to the transmission diagram in accordance with FIG. 3, with which all four planetary gear sets are designed as negative planetary gear sets, in the transmission diagram in accordance with FIG. 11, the second planetary gear set RS2 is designed as a positive planetary gear set, while the other three planetary gear sets RS1, RS3, RS4 are designed as negative planetary gear sets, without any change. Viewed spatially, the sequence of the four individual planetary gear sets in FIG. 11, arranged coaxially adjacent to each other, is unchanged in respect of FIG. 3, and this is likewise the case for the spatial arrangement of all seven shift elements A to G.

The structural adjustments caused by the transposition of the connection of the planetary gear carrier and ring gear of the positive planetary gear set in respect of the negative planetary gear set have already been described on the basis of FIG. 7 and therefore do not require repeating at this point, with the exception of the reference that the fifth shaft 5 in the transmission diagram in accordance with FIG. 11 acts as the first clutch shaft (and not as the second clutch shaft as in FIG. 7), and that the seventh shaft 7 in the transmission diagram in accordance with FIG. 11 acts as the third clutch shaft (and not as the fourth clutch shaft as in FIG. 7).

In knowledge of these two alternatives, described as examples, to the transmission diagram shown in FIG. 3, the specialist will easily generate alternatives with several positive planetary gear sets other than those listed in the table of FIG. 5. Thereby, in order to maintain the kinematics of the gear set system, only the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

Modifications and variations can be made to the embodiments illustrated or described herein without departing from the scope and spirit of the invention as set forth in the appended claims.

REFERENCE SIGNS

1 First shaft
2 Second shaft
3 Third shaft
4 Fourth shaft
5 Fifth shaft
6 Sixth shaft
7 Seventh shaft
8 Eighth shaft
9 Ninth shaft
A First shift element, first brake
B Second shift element, second brake
C Third shift element, first clutch
D Fourth shift element, second clutch
E Fifth shift element, third clutch
F Sixth shift element, fourth clutch
G Seventh shift element, fifth clutch
AN Drive shaft
AB Output shaft
GG Housing
RS1 First planetary gear set
SO1 Sun gear of the first planetary gear set
ST1 Planetary gear carrier of the first planetary gear set
PL1 Planetary gears of the first planetary gear set
HO1 Ring gear of the first planetary gear set
RS2 Second planetary gear set
SO2 Sun gear of the second planetary gear set
ST2 Planetary gear carrier of the second planetary gear set
PL2 Planetary gears of the second planetary gear set
HO2 Ring gear of the second planetary gear set
RS3 Third planetary gear set
SO3 Sun gear of the third planetary gear set
ST3 Planetary gear carrier of the third planetary gear set
PL3 Planetary gears of the third planetary gear set
HO3 Ring gear of the third planetary gear set
RS4 Fourth planetary gear set
SO4 Sun gear of the fourth planetary gear set
ST4 Planetary gear carrier of the fourth planetary gear set
PL4 Planetary gears of the fourth planetary gear set
HO4 Ring gear of the fourth planetary gear set

The invention claimed is:

1. An automatic transmission, comprising:
a housing;
a plurality of shafts having a drive shaft, an output shaft, a third shaft, a fourth shaft, a fifth shaft, a sixth shaft, a seventh shaft, an eighth shaft and a ninth shaft;
a plurality of planetary gear sets having a first planetary gear set, a second planetary gear set, a third planetary gear set and a fourth planetary gear set, each planetary gear set of the plurality of planetary gear sets comprising a first element, a second element and a third element; and
a plurality of shifting elements having a first shifting element, a second shifting element, a third shifting element, a fourth shifting element, a fifth shifting element, a sixth shifting element and a seventh shifting element,
wherein the second element of the fourth planetary gear set forms the drive shaft, the second element of the third planetary gear set forms the output shaft, the first element of the fourth planetary gear set forms the third shaft, one of the first, second or third elements of the first planetary gear set forms the fourth shaft, the third element of the second planetary gear set and the first element of the third planetary gear set are constantly connected to each other and form the fifth shaft, the third element of the third planetary gear set forms the sixth shaft, the first element of the second planetary gear set and the third element of the fourth planetary gear set are constantly connected to each other and form the seventh shaft, the second element of the second planetary gear set forms the eighth shaft, the first shifting element is configured for selectively coupling the third shaft to the housing, the fourth shaft is connected to the second shift element, the third shifting element is configured for selectively coupling the drive shaft to the fifth shaft, the ninth shaft is not directly connected to any of the planetary gear sets of the planetary gear sets, the fourth shifting element is configured for selectively coupling the ninth shaft to the sixth shaft, the fifth shifting element is configured for selectively coupling the ninth shaft to the seventh shaft, the sixth shifting element is configured for selectively coupling the ninth shaft to the eighth shaft, the first, second and third elements of the second planetary gear set rotating at a common rotational speed when the fifth and sixth shifting elements are closed, the seventh shifting element is configured for selectively coupling the drive shaft to the ninth shaft.

2. The automatic transmission of claim 1, wherein the first element of the first planetary gear set is constantly connected to the third shaft, the third element of the first planetary gear set forms the fourth shaft, the second shifting element configured for selectively coupling the fourth shaft to the housing, and the second element of the first planetary gear set is constantly connected to the sixth shaft.

3. The automatic transmission of claim 1, wherein the third element of the first planetary gear set is constantly connected to the housing, the first element of the first planetary gear set forms the fourth shaft, the second shifting element configured for selectively coupling the fourth shaft to the third shaft, and the second element of the first planetary gear set is constantly connected to the sixth shaft.

4. The automatic transmission of claim 1, wherein the third element of the first planetary gear set is constantly connected to the housing, the first element of the first planetary gear set is constantly connected to the third shaft, and the second element of the first planetary gear set forms the fourth shaft, the second shifting element configured for selectively coupling the fourth shaft to the sixth shaft.

5. The automatic transmission of claim 1, wherein the fifth shifting element and the sixth shifting element are arranged directly adjacent to each other.

6. The automatic transmission of claim 1, wherein the fourth shifting element, the fifth shifting element and the sixth shifting element are arranged directly adjacent to one another.

7. The automatic transmission of claim 1, wherein the fourth shifting element, the fifth shifting element, the sixth shifting element and the seventh shifting element are arranged directly adjacent to one another.

8. The automatic transmission of claim 1, wherein:
four of the shifting elements of the plurality of shifting elements are engaged in each gear of the automatic transmission; and
only one closed shift element of the plurality of shifting elements is opened and only one open shift element of the plurality of shifting elements is closed during each gear shift of the automatic transmission.

9. The automatic transmission of claim 1, wherein the first shifting element, the second shifting element, the sixth shifting element and the seventh shifting element are closed in a first forward gear, the first shifting element, the second shifting element, the third shifting element, and the sixth shifting element are closed in a second forward gear, the first shifting element, the second shifting element, the fifth shifting element and the sixth shifting element are closed in a third forward gear, the second shifting element, the third shifting element, the fifth shifting element and the sixth shifting element are closed in a fourth forward gear, the second shifting element, the fourth shifting element, the fifth shifting element and the sixth shifting element are closed in a fifth forward gear, the second shifting element, the third shifting element, the fourth shifting element and the fifth shifting element are closed in a sixth forward gear, the second shifting element, the third shifting element, the fourth shifting element, and the sixth shifting element are closed in a seventh forward gear, the third shifting element, the fourth shifting element, the fifth shifting element and the sixth shifting element are closed in an eighth forward gear, the first shifting element, the third shifting element, the fourth shifting element and the sixth shifting element are closed in a ninth forward gear, the first shifting element, the third shifting element, the fourth shifting element and the fifth shifting element are closed in a tenth forward gear, the first shifting element, the fourth shifting element, the fifth shifting element and the sixth shifting element are closed in an eleventh forward gear, and the first shifting element, the second shifting element, the fourth shifting element and the sixth shifting element are closed in a reverse gear.

10. The automatic transmission of claim 1, wherein each planetary gear set of the plurality of planetary gear sets are negative planetary gear sets.

11. The automatic transmission of claim 1, wherein one planetary gear set of the plurality of planetary gear sets is a positive planetary gear set.

12. The automatic transmission of claim 1, wherein the first planetary gear set or the second planetary gear set or the fourth planetary gear set is a positive planetary gear set.

13. The automatic transmission of claim 1, wherein two planetary gear sets of the plurality of planetary gear sets are positive planetary gear sets.

14. The automatic transmission of claim 1, wherein the third planetary gear set is a negative planetary gear set and each of the first planetary gear set, the second planetary gear set and the fourth planetary gear set is a positive planetary gear set.

15. The automatic transmission of claim 1, wherein each of the first, second, third and fourth planetary gear sets is either a negative planetary gear set or a positive planetary gear set, the first element of each negative planetary gear set and the first element of each positive planetary gear set are sun gears, the second element of each negative planetary gear set is a planetary gear carrier, the second element of each positive planetary gear set is a ring gear, the third element of each negative planetary gear set is a ring gear and the third element of each positive planetary gear set is a planetary gear carrier.

16. The automatic transmission of claim 1, wherein the planetary gear sets of the plurality of planetary gear sets are arranged coaxially next to one another and in an axial direction in the order of the first planetary gear set, the fourth planetary gear set, the second planetary gear set and the third planetary gear set.

17. The automatic transmission of claim 16, wherein the first shift element is arranged on a side of the first planetary gear set that faces away from the fourth planetary gear set.

18. The automatic transmission of claim 16, wherein the second shift element is arranged at least partly in an area radially around the first planetary gear set.

19. The automatic transmission of claim 16, wherein the second shift element is arranged on a side of the first planetary gear set that faces away from the fourth planetary gear set, axially adjacent to the first planetary gear set.

20. The automatic transmission of claim 16, wherein the second shift element is arranged at least partially in an area centrically within the first element of the first planetary gear set.

21. The automatic transmission of claim 16, wherein the second shift element is arranged in an area axially between the first planetary gear set and the fourth planetary gear set.

22. The automatic transmission of claim 16, wherein the second shift element is arranged at least partially in an area axially between the second planetary gear set and the third planetary gear set, axially adjacent to the third planetary gear set.

23. The automatic transmission of claim 16, wherein the second shift element is arranged at least partially in an area radially around the third planetary gear set.

24. The automatic transmission of claim 23, wherein the second shift element is formed as a positive-locking shift element.

25. The automatic transmission of claim 24, wherein the positive-locking second shift element is arranged at least partially centrically within the first element of the first planetary gear set.

26. The automatic transmission of claim 16, wherein the third shift element is arranged in an area axially between the second planetary gear set and the fourth planetary gear set.

27. The automatic transmission of claim 16, wherein the third shift element is arranged on a side of the third planetary gear set that faces away from the first planetary gear set.

28. The automatic transmission of claim 16, wherein the third shift element is arranged in an area axially between the second planetary gear set and the third planetary gear set, axially adjacent to the second planetary gear set.

29. The automatic transmission of claim 16, wherein the fourth shift element is arranged on a side of the second planetary gear set that faces away from the fourth planetary gear set.

30. The automatic transmission of claim 16, wherein the fourth shift element is arranged in an area axially between the second planetary gear set and the third planetary gear set, axially adjacent to the third planetary gear set.

31. The automatic transmission of claim 16, wherein the fourth shift element is arranged in an area axially between the second planetary gear set and the fourth planetary gear set, axially adjacent at least one of the second planetary gear set, the fifth shift element or the sixth shift element.

32. The automatic transmission of claim 16, wherein the fifth shift element is arranged in an area axially between the second planetary gear set and the fourth planetary gear set, axially adjacent at least one of the fourth planetary gear set or the sixth shift element.

33. The automatic transmission of claim 16, wherein the sixth shift element is arranged in an area axially between the second planetary gear set and the fourth planetary gear set, axially adjacent at least one of the second planetary gear set or the fifth shift element.

34. The automatic transmission of claim 16, wherein the seventh shift element is arranged in an area axially between the first planetary gear set and the fourth planetary gear set.

35. The automatic transmission of claim 16, wherein the seventh shift element is arranged in an area radially around the fourth planetary gear set.

36. The automatic transmission of claim 16, wherein the seventh shift element is arranged in an area axially between the second planetary gear set and the fourth planetary gear set.

37. The automatic transmission of claim 36, wherein the seventh shift element is arranged in an area radially around at least one of the fifth shift element or the sixth shift element.

* * * * *